United States Patent
Kim et al.

(10) Patent No.: US 9,946,450 B2
(45) Date of Patent: Apr. 17, 2018

(54) SCROLLING DISPLAY CONTROL INTERFACE APPARATUSES, METHODS AND COMPUTER-READABLE STORAGE MEDIUMS

(71) Applicants: Jung June Kim, Seongnam-si (KR); Se Il Hwang, Seongnam-si (KR); Kyung Hee Yoon, Seongnam-si (KR); Hye Deuk Lee, Seongnam-si (KR); Bong Jun Jeon, Seongnam-si (KR); Hyun Ah Hwang, Seongnam-si (KR)

(72) Inventors: Jung June Kim, Seongnam-si (KR); Se Il Hwang, Seongnam-si (KR); Kyung Hee Yoon, Seongnam-si (KR); Hye Deuk Lee, Seongnam-si (KR); Bong Jun Jeon, Seongnam-si (KR); Hyun Ah Hwang, Seongnam-si (KR)

(73) Assignee: Naver Corporation, Gyeonggi-Do (KR)

( * ) Notice: Subject to any disclaimer, the term of this patent is extended or adjusted under 35 U.S.C. 154(b) by 182 days.

(21) Appl. No.: 14/820,744

(22) Filed: Aug. 7, 2015

(65) Prior Publication Data
US 2016/0042721 A1 Feb. 11, 2016

(30) Foreign Application Priority Data
Aug. 8, 2014 (KR) ........................ 10-2014-0102615

(51) Int. Cl.
*G06F 3/0485* (2013.01)
*G06T 3/20* (2006.01)
(Continued)

(52) U.S. Cl.
CPC ........ *G06F 3/0485* (2013.01); *G06F 3/04883* (2013.01); *G06T 3/20* (2013.01); *G06F 3/048* (2013.01); *G06F 2203/04808* (2013.01)

(58) Field of Classification Search
CPC .. G06F 3/0485; G06F 3/0488; G06F 3/04883; G06T 3/20
See application file for complete search history.

(56) References Cited

U.S. PATENT DOCUMENTS

| 8,209,614 B2 | 6/2012 | Ishihara et al. |
| 9,342,234 B2 | 5/2016 | Kobayashi et al. |

(Continued)

FOREIGN PATENT DOCUMENTS

| JP | 2009048310 A | 3/2009 |
| JP | 2012058979 A | 3/2012 |

(Continued)

OTHER PUBLICATIONS

Maximilianpo Firtman, jQuery Mobile: Up and Running. O'Reilly Media, Feb. 2012, 67-69.

*Primary Examiner* — Michelle L Sams
(74) *Attorney, Agent, or Firm* — Harness, Dickey & Pierce, P.L.C.

(57) ABSTRACT

A method for controlling a terminal screen includes: first displaying, on a screen of a terminal, a first function input unit and at least a portion of a page of content on a screen, the first function input unit being associated with at least a first function for the terminal; recognizing a scroll operation on the screen; and second displaying, in response to the recognizing the scroll operation on the screen, a second function input unit instead of at least a portion of the first function input unit, the second function input unit being associated with a second function for the terminal.

20 Claims, 8 Drawing Sheets

(51) Int. Cl.
*G06F 3/0488* (2013.01)
*G06F 3/048* (2013.01)

(56) References Cited

U.S. PATENT DOCUMENTS

| | | | | |
|---|---|---|---|---|
| 2002/0021278 | A1* | 2/2002 | Hinckley | G06F 1/1626 |
| | | | | 345/156 |
| 2012/0013551 | A1* | 1/2012 | Martinoli | G06F 3/0486 |
| | | | | 345/173 |
| 2012/0066627 | A1* | 3/2012 | Furukawa | G06F 3/0488 |
| | | | | 715/768 |
| 2013/0024808 | A1* | 1/2013 | Rainisto | G06F 3/0488 |
| | | | | 715/784 |
| 2014/0007005 | A1* | 1/2014 | Libin | G06F 3/0485 |
| | | | | 715/784 |
| 2014/0152585 | A1 | 6/2014 | Andersson Reimer | |
| 2015/0199082 | A1* | 7/2015 | Scholler | G06F 3/04883 |
| | | | | 715/786 |
| 2015/0326742 | A1 | 11/2015 | Ogino et al. | |

FOREIGN PATENT DOCUMENTS

| | | | |
|---|---|---|---|
| JP | 2012065816 A | | 4/2012 |
| JP | 2012068816 A | * | 4/2012 |
| JP | 2013109587 A | | 6/2013 |
| JP | 2014089489 A | | 5/2014 |
| KR | 1020130080947 A | | 7/2013 |

* cited by examiner

SCROLLING DISPLAY CONTROL INTERFACE APPARATUSES, METHODS AND COMPUTER-READABLE STORAGE MEDIUMS

CROSS-REFERENCE TO RELATED APPLICATION(S)

This application claims priority under 35 U.S.C. § 119 to Korean Patent Application No. 10-2014-0102615, filed on Aug. 8, 2014, in the Korean Intellectual Property Office, the entire contents of which are incorporated herein by reference.

BACKGROUND

Field

One or more example embodiments relate to display control apparatuses, display control methods, and/or computer-readable storage mediums storing one or more computer programs for executing display control methods on computers or computer devices.

Description of the Related Art

Moving a page displayed on a screen or a panel in a vertical and/or horizontal direction is referred to as scrolling. When scrolling, a portion of information displayed on the screen disappears, and new information corresponding to the portion that has disappeared appears on the opposite side. Since the amount of information displayed on one page is often larger than the amount of information that may be displayed on the screen simultaneously or concurrently, scrolling functions are used frequently. A viewer may read information on the screen while scrolling. Devices such as consoles, word processors, mobile terminals, personal computers (PCs), and the like, have scrolling functions.

When an external device such as a mouse is provided, scrolling may be performed by moving a wheel or dragging a scroll bar. If a touch pad is provided, scrolling may be performed by directly clicking or dragging a page on a screen.

SUMMARY

One or more example embodiments include display control apparatuses, display control methods, and/or computer programs for executing display control methods on computers and/or computer devices capable of relatively quickly scrolling up to a top end of a page on which content is displayed in a time sequence.

One or more example embodiments include display control apparatuses, display control methods, and/or computer programs for executing display control methods on computers and/or computer devices capable of providing visual effects to scrolling functions.

At least one example embodiment provides a display control method comprising: first displaying, on a screen of a terminal, a first function input unit and at least a portion of a page of content, the first function input unit being associated with a first function for the terminal; recognizing a scroll operation on the screen; and second displaying, in response to the recognizing the scroll operation on the screen, a second function input unit instead of at least a portion of the first function input unit, the second function input unit being associated with a second function for the terminal.

At least one other example embodiment provides a tangible or non-transitory computer-readable storage medium storing computer executable instructions that, when executed by a computer device, cause the computer device to execute a display control method comprising: first displaying, on a screen of a terminal, a first function input unit and at least a portion of a page of content, the first function input unit being associated with a first function for the terminal; recognizing a scroll operation on the screen; and second displaying, in response to the recognizing the scroll operation on the screen, a second function input unit instead of at least a portion of the first function input unit, the second function input unit being associated with a second function for the terminal.

According to at least some example embodiments, the second displaying may include: removing the at least the portion of the first function input unit from the screen; and inserting the second function input unit on the screen. The removing may remove the at least the portion of the first function input unit while the screen is continuously moving in a first direction; and the inserting may insert the second function input unit at a location from which the at least the portion of the first function input unit has been removed.

According to at least some example embodiments, the method may further include: determining that the scroll operation has stopped; removing the second function input unit from the screen; and displaying the at least the portion of the first function input unit on the screen.

The second displaying may include replacing the at least the portion of the first function input unit with the second function input unit on the screen. The replacing may include changing the at least the portion of the first function input unit to the second function input unit while the at least the portion of the first function input unit continuously moves in a first direction. According to at least some other example embodiments, the replacing may include: changing an icon representing the at least the portion of the first function input unit to an icon representing the second function input unit.

According to at least some example embodiments, the method may further include: determining that the scroll operation has stopped; and changing the second function input unit into the at least the portion of the first function input unit in response to determining that the scroll operation has stopped.

According to at least some example embodiments, the method may further include: moving, in response to selection of the second function input unit, to one of a start and an end of the page of content such that the screen displays the one of the start and the end of the page of content at an end of the screen, the one of the start and the end of the page of content being in a direction opposite to a scroll direction of the scroll operation. The one of the start and the end of the page of content may be an upper end of the page of content, and the scroll direction may be towards a lower end of the page of content.

According to at least some example embodiments, the method may further include: third displaying, in response to movement of the second function input unit, the at least the portion of the first function input unit on the screen instead of the second function input unit.

According to at least some example embodiments, the method may further include: third displaying, in response to movement of the second function input unit through a touch and drag by a user, the at least the portion of the first function input unit on the screen instead of the second function input unit.

According to at least some example embodiments, the method may further include: arranging and displaying the at least the portion of the content in a time sequence.

According to at least some example embodiments, the method may further include: detecting that a speed of the scroll operation exceeds a threshold speed; and wherein the second displaying displays the second function input unit instead of the at least the portion of the first function input unit in response recognizing the scroll operation and detecting that the speed of the scroll operation is greater than or equal to the threshold speed.

At least one other example embodiment provides an apparatus to control a terminal screen, the apparatus comprising: a memory having computer-readable instructions stored therein and at least one processor. The at least one processor is configured to execute the computer-readable instructions to: display, on a screen of a terminal, a first function input unit and at least a portion of a page of content; recognize a scroll operation on the portion of the page of content; and display, in response to recognizing the scroll operation on the portion of the page of content, a second function input unit instead of at least a portion of the first function input unit.

According to at least some example embodiments, the at least one processor may be further configured to: remove, in response to the recognizing the scroll operation on the portion of the page of content, the at least the portion of the first function input unit from the terminal screen; display the second function input unit on the terminal screen; recognize that the scroll operation has stopped; remove, in response to recognizing that the scroll operation has stopped, the second function input unit from the terminal screen; and display the at least the portion of the first function input unit on the terminal screen.

According to at least some example embodiments, the at least one processor may be further configured to: change the at least the portion of the first function input unit into the second function input unit in response to recognizing the scroll operation; recognize that the scroll operation has stopped; and change, in response to recognizing that the scroll operation has stopped, the second function input unit into the at least the portion of the first function input unit.

The at least one processor may be further configured to move, in response to selection of the second function input unit, to one of a start and an end of the page of content such that the screen displays the one of the start and the end of the page of content at an end of the screen, the one of the start and the end of the page of content being in a direction opposite to a scroll direction of the scroll operation.

BRIEF DESCRIPTION OF THE DRAWINGS

Example embodiments will become apparent and more readily appreciated from the following description of some example embodiments, taken in conjunction with the accompanying drawings in which.

DETAILED DESCRIPTION

Reference will now be made in detail to embodiments, examples of which are illustrated in the accompanying drawings, wherein like reference numerals refer to like elements throughout. In this regard, the example embodiments may have different forms and should not be construed as being limited to the descriptions set forth herein. Accordingly, some example embodiments are described below, by referring to the figures, to explain aspects of the present description. It will be understood that although the terms "first", "second", etc. may be used herein to describe various components, these components should not be limited by these terms. These components are only used to distinguish one component from another. As used herein, the singular forms "a," "an" and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. Sizes of elements in the drawings may be exaggerated for convenience of explanation. In other words, since sizes and thicknesses of components in the drawings are arbitrarily illustrated for convenience of explanation, the following embodiments are not limited thereto.

The example embodiments as disclosed herein may comprise program code including program instructions, software components, software modules, data files, data structures, and/or the like that are implemented by one or more physical hardware devices. Examples of program code include both machine code produced by a compiler and higher level program code that is executed using an interpreter. The hardware devices may include one or more processors. The one or more processors are computer processing devices configured to carry out the program code by performing arithmetical, logical, and input/output operations. Once the program code is loaded into the one or more processors, the one or more processors may be programmed to perform the program code, thereby transforming the one or more processors into special purpose processor(s).

Alternatively, or in addition to the processors discussed above, the hardware devices may include one or more Central Processing Units (CPUs), digital signal processors (DSPs), application-specific-integrated-circuits (ASICs), SoCs, field programmable gate arrays (FPGAs), or the like. In at least some cases, the one or more CPUs, SoCs, DSPs, ASICs and FPGAs, may generally be referred to as processing circuits, microprocessors, controller or controlling circuitry, processing circuitry, etc.

The hardware devices may also include one or more storage devices. The one or more storage devices may be tangible or non-transitory computer-readable storage media, such as random access memory (RAM), read only memory (ROM), a permanent mass storage device (such as a disk drive), and/or any other like data storage mechanism capable of storing and recording data. The one or more storage devices may be configured to store program code for one or more operating systems and/or the program code for implementing the example embodiments described herein. The program code may also be loaded from a separate computer readable storage medium into the one or more storage devices and/or the one or more processors using a drive mechanism. Such separate computer readable storage medium may include a USB flash drive, memory stick, Blu-ray/DVD/CD-ROM drive, memory card, and/or other like computer readable storage medium (not shown). The program code may be loaded into the one or more storage devices and/or the one or more processors from a remote data storage device via a network interface, rather than via a computer readable storage medium. Additionally, the program code may be loaded into the one or more storage devices and/or the one or more processors from a remote computing system that is configured to transfer and/or distribute the program code over a network. The remote computing system may transfer and/or distribute the program code via a wired interface, an air interface, and/or any other like tangible or intangible medium. The one or more processors, the one or more storage devices, and/or the program code may be specially designed and constructed for the purposes of the example embodiments, or they may be known devices that are altered and/or modified for the purposes of the example embodiments.

Figure 1:
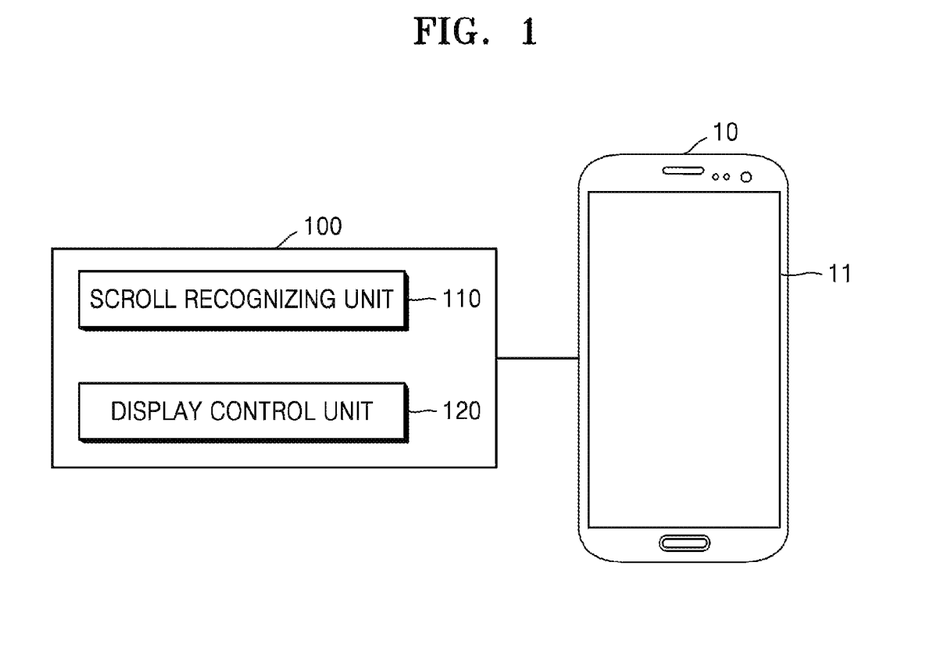
FIG. 1 is a diagram schematically illustrating a display control apparatus according to an example embodiment.

FIG. 1 is a diagram schematically illustrating an example embodiment of a display control apparatus 100.

The display control apparatus 100, according to at least this example embodiment, may correspond to, or include, at least one processor or processing circuit. Thus, the display control apparatus 100 may be driven and/or implemented in a form included in another hardware device such as a micro-processor or a special-purpose computer system. For example, the display control apparatus 100 may be mounted on or implemented in a terminal including a display unit (or display device) capable of displaying content on a screen of the terminal.

To prevent features of the example embodiment shown in FIG. 1 from being obscured, only components of the display control apparatus 100 that are associated with this example embodiment are illustrated. However, the display control apparatus may include components other than the components illustrated in FIG. 1.

Referring to FIG. 1, the display control apparatus 100 controls a screen 11 of a terminal 10 to display a page (e.g., of content) thereon. According to at least this example embodiment, when a page displayed on the screen 11 is scrolled, the display control apparatus 100 controls display of content of the page on the screen 11. For example, when a page on which first function input unit (e.g., menu buttons) and content arranged in a time sequence are displayed, if a scroll operation is performed faster than a threshold (or, alternatively, predetermined) speed, then the display control apparatus 100 may display a second function input unit (e.g., a top button) instead of the first function input unit on the screen 11. According to at least some example embodiments, the second function input unit enables the display control apparatus 100 to perform quicker and/or more convenient movement to a top end of the page according to user input through the second function input unit.

As shown in FIG. 1, the display control apparatus 100 includes a scroll recognizing unit 110 and a display control unit 120. The scroll recognizing unit 110 may also be referred to as a scroll recognizing circuit 110, and the display control unit 120 may also be referred to as a display control circuit 120. Moreover, the scroll recognizing unit 110 and the display control unit 120 may be part of a processor or control circuitry configured to perform the functions of the scroll recognizing unit 110 and the display control unit 120.

In example operation, the scroll recognizing unit 110 recognizes a scroll operation input by a user. According to at least this example embodiment, the scroll recognizing unit 110 may recognize one or more of speed, direction, position, etc., of the scroll operation input by the user. According to at least some example embodiments, the user may input the scroll operation through: a touch and drag operation using a touch panel; an operation, such as a gesture, a motion, or the like, using a motion recognition function; using a separate input device such as a wheel of a mouse, a jog-pad, or the like; or by manipulating a scroll bar displayed on the screen 11. Example embodiments should not, however, be limited to these examples.

The display control unit 120 controls scrolling of the page displayed on the screen 11 based on the scroll operation recognized by the scroll recognizing unit 110. In at least some example embodiments, the display control unit 120 displays the first function input unit on the screen 11. While the first function input unit is displayed on the screen 11, if the scroll recognizing unit 110 recognizes the scroll operation or if the scroll recognizing unit 110 recognizes the scroll operation and that a speed of the scroll operation is greater than or equal to a threshold speed, then the display control unit 120 may display the second function input unit instead of the first function input unit on the screen 11. Examples of the first function input unit and the second function input unit will be discussed in more detail later with regard to FIGS. 4 and 6. According to at least some example embodiments, the first function input unit and the second function input unit may be interfaces with which the user may interact.

Furthermore, when the scroll recognizing unit 110 recognizes an end of the scroll operation, or there is no user input for at least a threshold (or, alternatively, predetermined) period of time, the display control unit 120 may control the second function input unit to disappear (be removed) from the screen 11 and the first function input unit to be displayed on the screen 11. Alternatively, when the scroll recognizing unit 110 recognizes the end of the scroll operation, or there is no user input for at least the threshold period of time, the display control unit 120 may change the second function input unit to the first function input unit, such that the first function input unit is displayed on the screen 11.

Still referring to FIG. 1, if the user selects the second function input unit through an operation such as a touch, then the display control unit 120 may move to the end of a side that is opposite to a scroll direction on the page displayed on the screen 11, and display the portion of the page at the end of the side opposite to the scroll direction on the screen 11. For example, if the user scrolls down through a touch and drag operation, and touches the second function unit, then the display control unit 120 may move to an uppermost end of the page, which is the end of the side opposite to the scroll direction (e.g., a down direction) and control the uppermost end of the page to be displayed on the screen 11. As described above, one input may be used to enable movement to the uppermost end of the page, and thus, desired content may be obtained more quickly and/or conveniently, thereby improving user convenience and/or increasing interest in a user interface (UI) and/or user experience (UX) supporting this functionality.

The display control unit 120 may control the second function input unit to be displayed at an end of the scroll direction on the screen 11. For example, if the user scrolls down through a touch and drag operation, then the display control unit 120 may control the second function input unit to be displayed on a lower end of the screen 11.

In one example, content on the page displayed on the screen 11 may be arranged in a date sequence. A date display unit may be displayed on one side of the content arranged in the date sequence. In one example, the date display unit "Apr. 21, 2014" may be displayed on upper sides of a plurality of portions of the content prepared (e.g., corrected or updated) on Apr. 21, 2014, and the data display unit "Apr. 20, 2014" may be displayed on upper sides of a plurality of portions of content arranged there below, and prepared on Apr. 20, 2014. An example embodiment of the date display unit will be discussed in more detail later with regard to FIG. 4. According to at least some example embodiments, the date display unit may be an interface with which the user may interact.

According to at least some example embodiments, the display control unit 120 may provide various display interfaces in addition to the scroll function. For example, if the user clicks on a specific region of the content, then the display control unit 120 may expand the clicked region of the content to display the selected content region in an expanded state. If the selected content region remains in the expanded state for at least (e.g., greater than or equal to) a threshold (or, alternatively, predetermined) period of time, then the display control unit 120 may release the expanded state of the selected content region.

According to at least some example embodiments, the display control unit 120 may determine at least one of a moving speed, a moving distance, a moving time, and a moving direction of the content according to speed of the scroll operation or a page scroll speed corresponding to the speed of the scroll operation. In this regard, the moving direction of content may be determined to be the same or substantially the same as the direction of the page scroll speed.

Figure 2:
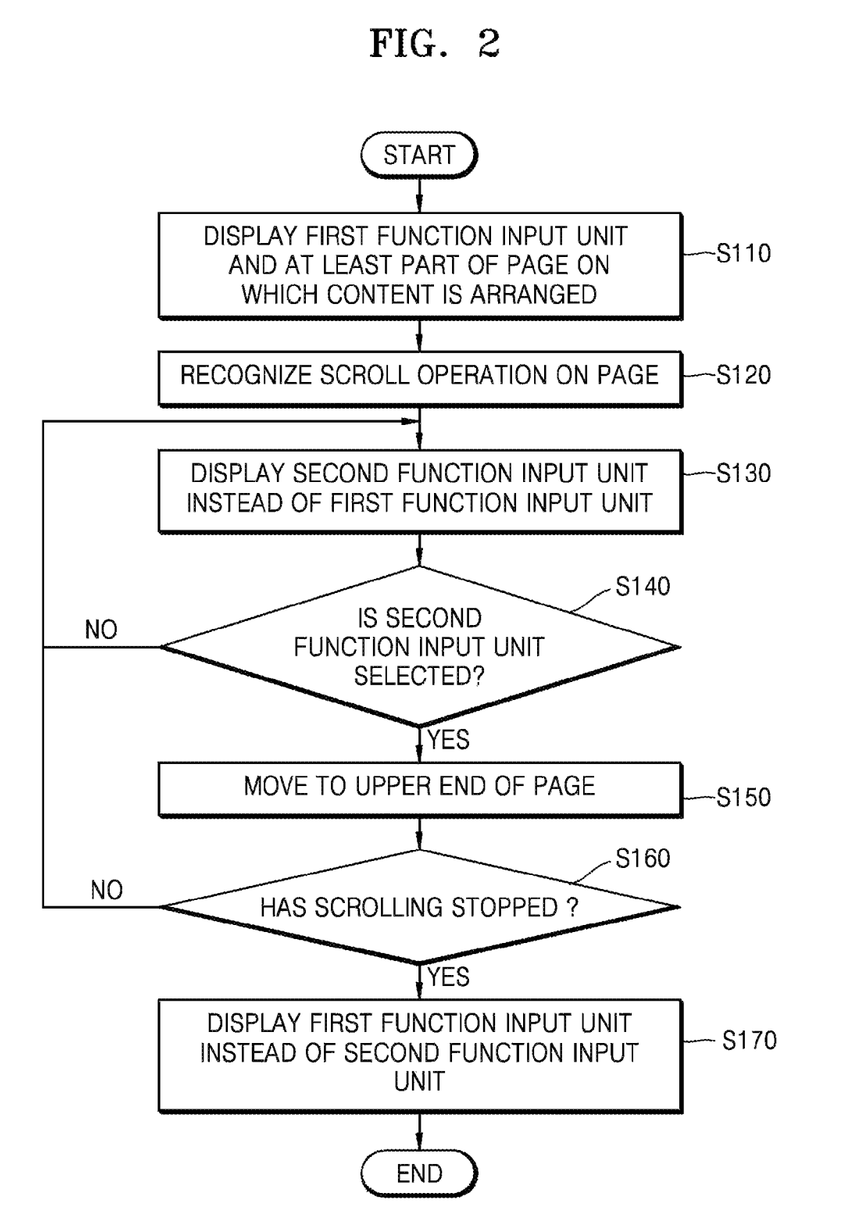
FIG. 2 is a flowchart illustrating a display control method according to an example embodiment.

FIG. 2 is a flowchart illustrating an example embodiment of a display control method.

The flowchart illustrated in FIG. 2 includes operations that may be processed serially by the display control apparatus 100 illustrated in FIG. 1. For example purposes, the example embodiment shown in FIG. 2 will be described with regard to the example embodiment shown in FIG. 1. However, example embodiments should not be limited to this example.

Referring to FIG. 2, at operation S110 the screen 11 displays a first function input unit and at least a portion of a page on which content is arranged. In at least one example, the content may be arranged in a time sequence.

At operation S120, the scroll recognizing unit 110 recognizes a scroll operation on the page.

After recognizing the scroll operation at operation S120, the display control unit 120 controls the screen 11 to display a second function input unit instead of the first function input unit at operation S130.

At operation S140, the display control unit 120 determines whether the user has selected the second function input unit. If the display control unit 120 determines that the user has selected the second function input unit at operation S140, then in at least one example embodiment, at operation S150 the display control unit 120 moves to an uppermost end of the page. In this regard, when the user selects the second function input unit the screen 11 displays the content at an uppermost end of the page.

Still referring to FIG. 2, at operation S160 the display control unit 120 determines whether the scroll operation has stopped. If the display control unit 120 determines that the scroll operation has stopped at operation S160, then at operation S170 the display control unit 120 controls the screen 11 to display the first function input unit instead of the second function input unit (e.g., at the current position of the second function input unit or at the original position of the first function input unit). In this regard, when the scroll operation has stopped, the first function input unit instead of the second function input unit may be displayed (e.g., immediately displayed) on the screen 11. Alternatively, the display control unit 120 may cause the first function input unit to be displayed on the screen instead of the second function input unit after (e.g., only after) a threshold period of time elapses after the scroll operation has stopped.

Returning to operation S160 in FIG. 2, if the display control unit 120 determines that the scrolling operation continues (has not stopped), then the process returns to operation S130 and proceeds as discussed above.

Returning to operation S140, if the user has not selected the second function input unit, then the process returns to operation S130 and the second function input unit is displayed (e.g., continuously displayed) on the screen 11.

Figure 3:
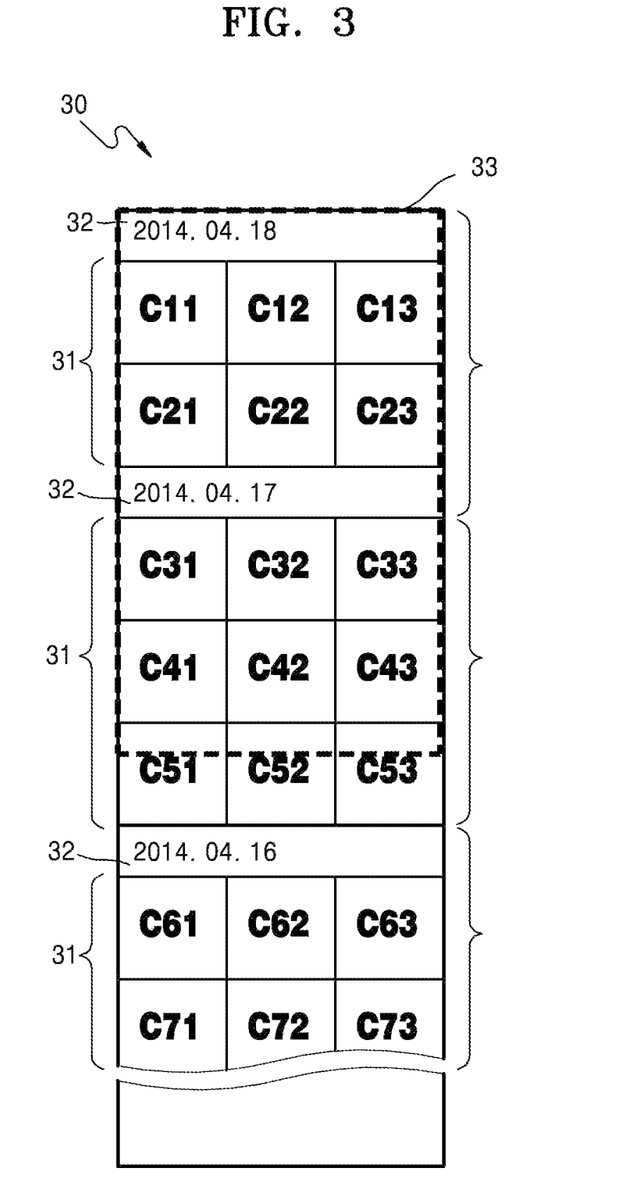
FIG. 3 illustrates an example of a page and a screen displaying a part of the page, according to an example embodiment.

FIG. 3 illustrates an example of a page 30 and the screen 11 displaying a part of the page 30, according to an example embodiment.

Referring to FIG. 3, the page 30 includes a plurality of content regions 31. Each of the plurality of content regions 31 provides a group of content portions from among the content portions C11, C12, C13, . . . , C71, C72, C73, . . . .

In this example, the portions of content C11, C12, C13, . . . , C71, C72, C73, . . . are arranged on the page 30 in a time sequence. The content portions C11, C12, C13, . . . , C71, C72, C73, . . . arranged in a time sequence may be grouped and displayed in a date sequence. A date display unit 32 may also be displayed on a side (e.g., an upper side) of the respective content regions 31. In this regard, the content regions 31 may be separated from one another by date display units 32.

FIG. 3 illustrates an example of forming the page 30 by arranging the portions of content C11, C12, C13, . . . , C71, C72, C73, . . . in lines to form the content regions 31. In this example, the portions of content C11, C12, C13, . . . , C71, C72, C73, . . . arranged in date sequence are displayed in three vertical columns in each of the content regions 31. The date display unit 32 displaying its corresponding date is displayed on an upper side of each of the content regions 31 in which the portions of content C11, C12, C13, . . . , C71, C72, C73, . . . are arranged and displayed in date sequence. In this example, the date display unit 32 displays a date (e.g., month, day and year). However, example embodiments are not limited thereto. The date display unit 32 may display, for example, a month or a year according to a distribution frequency of the portions of content C11, C12, C13, . . . , C71, C72, C73, . . . .

Figure 5:
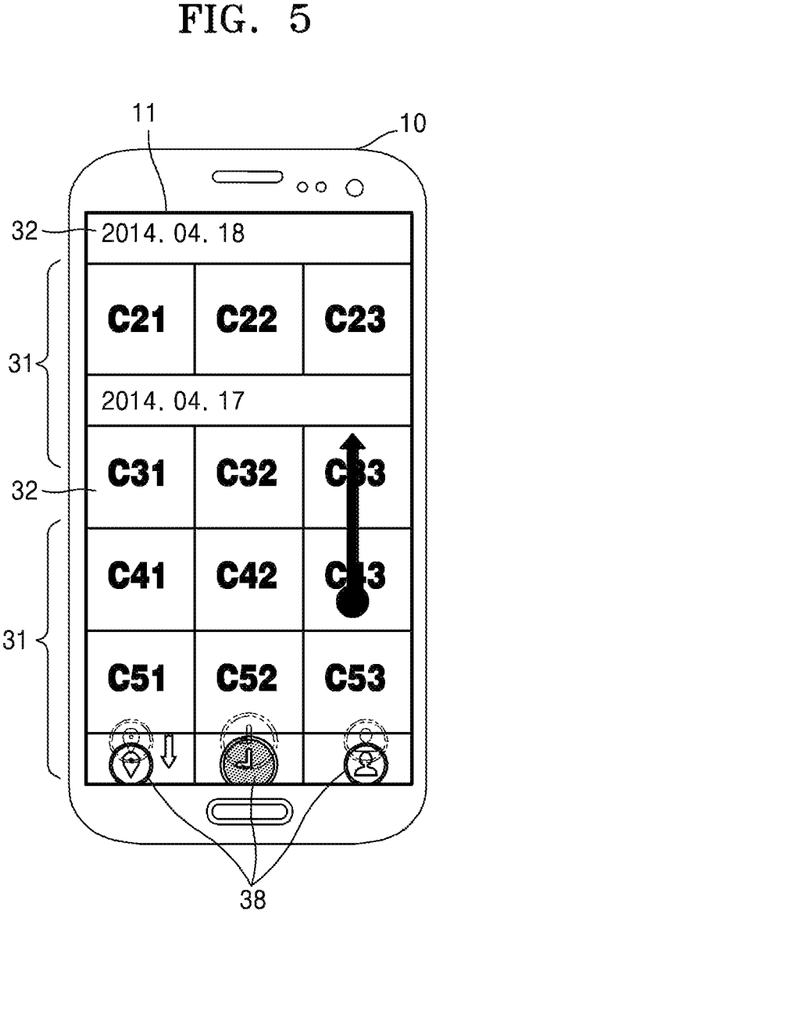

In FIG. 3, the portion of the page 30 displayed on the screen 11 of the terminal 10 at a given time is identified as a display region 33. A user may scroll through the content of the page 30 by performing a scroll operation on the page 30 displayed on the screen 11 of the terminal 10. An example of the scroll operation in which the user actually touches and drags the screen 11 is illustrated in FIG. 5, and discussed in more detail later.

When the user performs a scroll operation, the page 30 scrolls and a content region hidden outside the display region 33 of the screen 11 appears in the display region 33.

Prior to performing a scroll operation, a first function input unit (e.g., a menu button) is displayed (e.g., at a top or bottom portion) in the display region 33 on the screen 11. When the scroll operation is performed (e.g., faster than a threshold speed), a second function input unit (e.g., a top button), instead of the first function input unit, is displayed on the screen 11. In one example, when the scroll operation is performed (e.g., faster than a threshold speed), the first function input unit is removed from the display region 33 and the second function input unit is displayed in the display region 33. In an example in which the scroll operation is downward, the display of the second function input unit enables the user to move to an uppermost end of the page 30 more quickly and/or conveniently by selecting the second function input unit. This example embodiment will be described in more detail below.

FIGS. 4 through 8 are diagrams for describing each operation of an example embodiment of a display control method in more detail.

Figure 4:
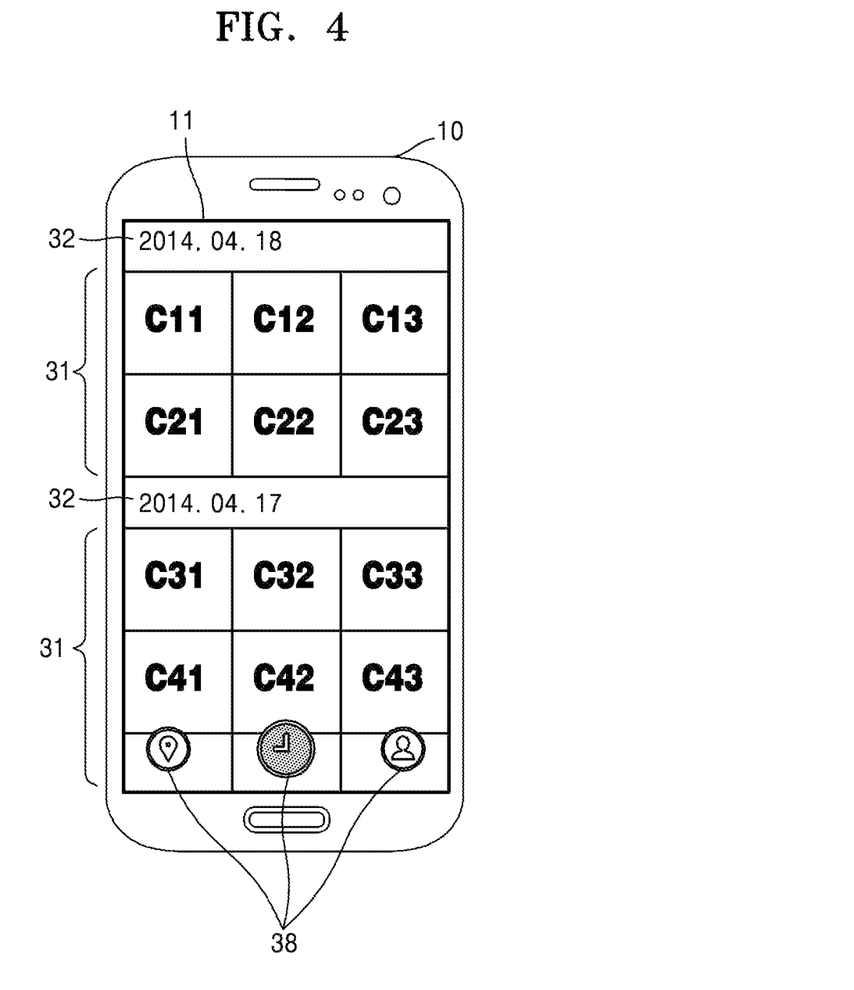
FIGS. 4 through 8 are diagrams for describing operations of an example embodiment of a display control method in more detail.

Referring to FIG. 4, at least a part of a page on which content is arranged in a time sequence is displayed on the screen 11 (operation S110). In this example, the portions of content C11, C12, C13, . . . , C71, C72, C73, . . . are grouped into a plurality of groups of content portions (also referred to as content regions) 31 according to date, and the plurality of content regions 31 are arranged on the screen 11 in a time sequence. The date display unit 32 is further displayed at a side (e.g., an upper side) of each of the plurality of content regions 31 such that at least some of the plurality of content regions 31 are separated from one another by the date display units 32.

As shown in FIG. 4, one or more first function input units 38 are also displayed on the screen 11. The one or more first function input units 38 may be associated with and/or perform a first function, for example, when selected by a user. For example, the first function input unit 38 may include a menu button for moving to a specific menu. The example shown in FIG. 4 illustrates a state in which three menu buttons are displayed. The middle menu button represents (or is associated with) the menu currently being displayed on the screen 11. In this state, if a user selects the left menu button through a touch, then the screen 11 may move to a menu corresponding to the left menu button. Similarly, if the user selects the right menu button, then the screen 11 may move to a menu corresponding to the right menu button. In the example shown in FIG. 4, the middle menu button is a watch icon representing, corresponding to, or associated with, the timeline menu shown in FIG. 4; the left menu button is a map icon representing, corresponding to, or associated with, a map menu; and the right menu button is a person icon representing, corresponding to, or associated with, a content share menu.

Figure 6:
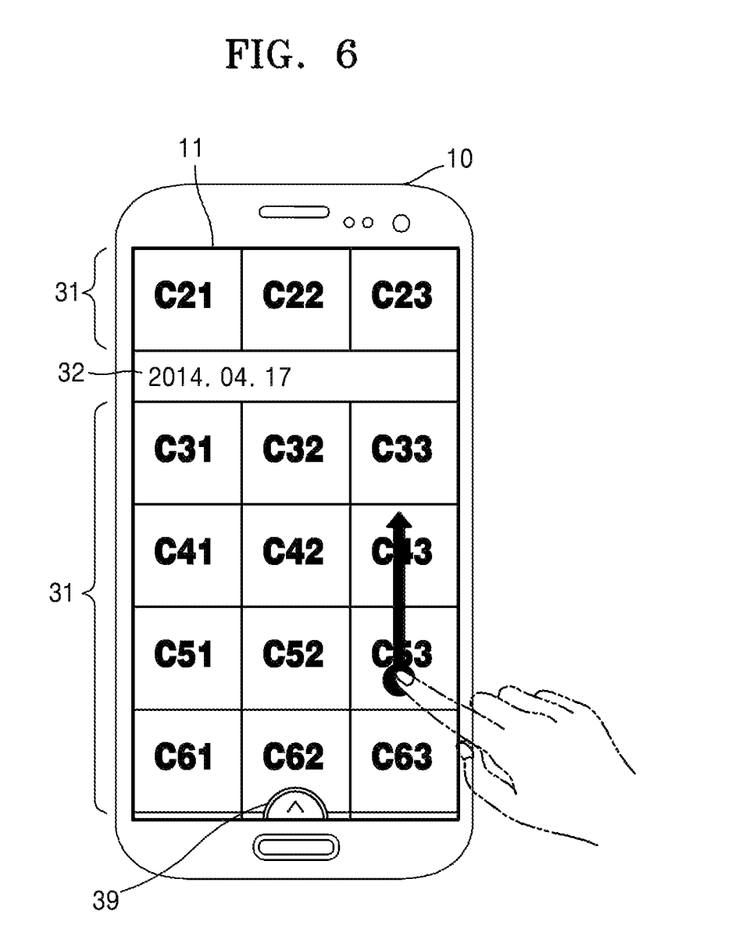
Figure 7:
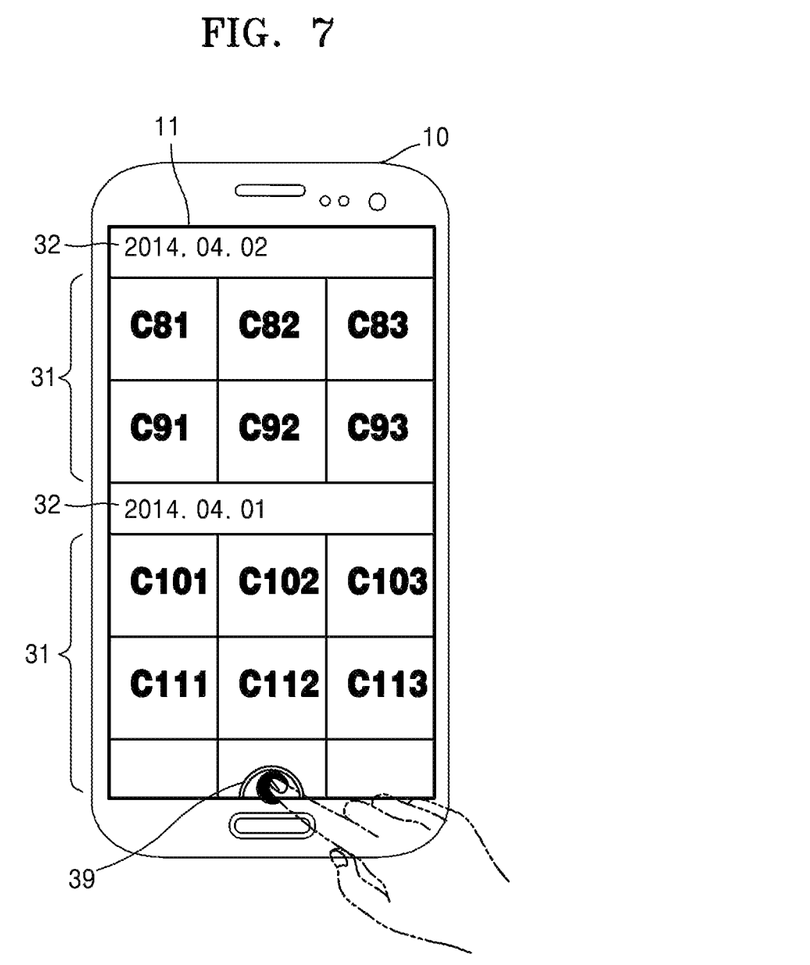
Figure 8:
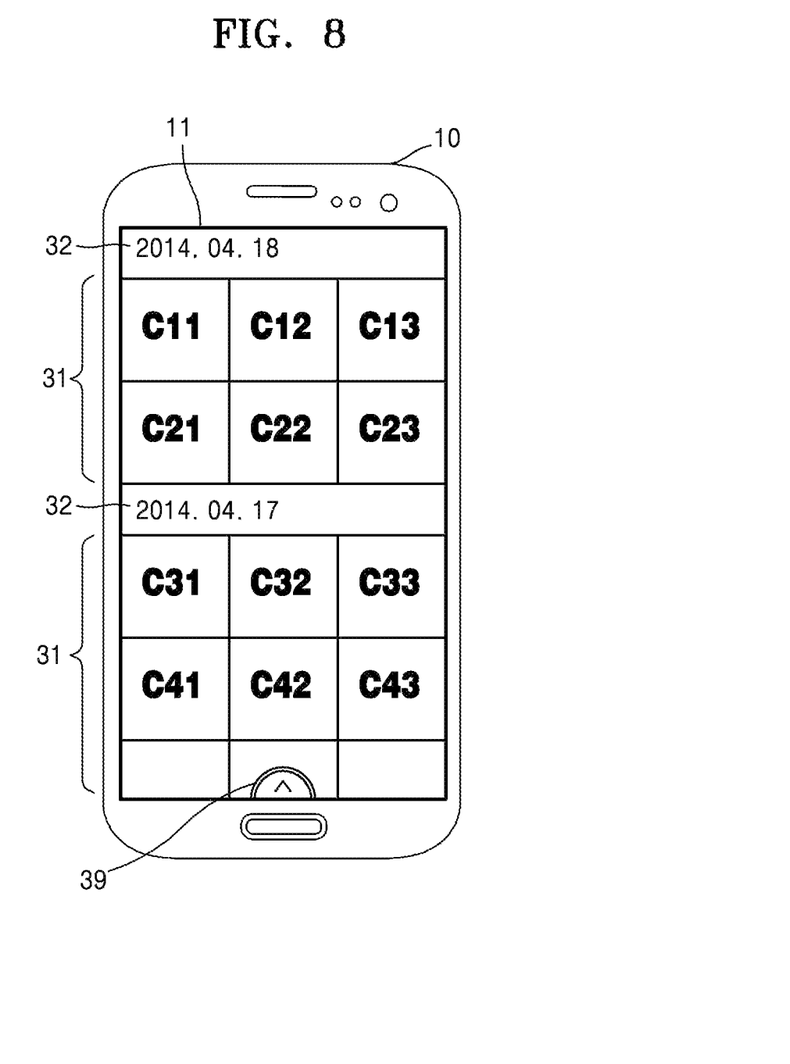

Referring to FIGS. 5 and 6, while the first function input unit 38 is displayed on the screen 11 as described above, if a scroll operation is performed on the page and the scroll recognizing unit 110 recognizes and/or detects the scroll operation (operation S120), then the display control unit 120 displays a second function input unit 39 as shown in FIG. 6 instead of the first function input unit 38 on the screen 11 (operation S130). In this regard, the replaces the first function input unit 38 with the second function input unit 39.

In at least one example embodiment, the display control unit 120 may control the second function input unit 39, rather of the first function input unit 38, to be displayed on the screen 11 (operation S130) immediately when the scroll recognizing unit 110 recognizes the scroll operation. For example, the display control unit 120 may replace the first function input unit 38 with the second function input unit 39 immediately when the scroll recognizing unit 110 recognizes the scroll operation.

Alternatively, when the scroll recognizing unit 110 recognizes the scroll operation, the display control unit 120 may determine a scroll speed and only when the scroll speed is greater than or equal to a threshold speed (or, alternatively, a predetermined speed), the display control unit 120 may control the second function input unit 39, rather than the first function input unit 38, to be displayed on the screen 11 (operation S130). In this example, the display control unit 120 may replace the first function input unit 38 with the second function input unit 39 when the scroll speed is greater than or equal to a threshold speed.

In yet another alternative, when the scroll recognizing unit 110 recognizes the scroll operation, the display control unit 120 may determine a scroll operation input time and only when the scroll operation input time is greater than or equal to a threshold length of time (or, alternatively, a predetermined time interval), the display control unit 120 may control the second function input unit 39, rather than the first function input unit 38, to be displayed on the screen 11 (operation S130). In this example, the display control unit 120 may replace the first function input unit 38 with the second function input unit 39 when the length of time of the scroll operation is greater than the threshold.

As shown in FIG. 5, if the user starts performing the scroll operation on the screen 11, then the first function input unit 38 continuously moves to an end (lower part of FIG. 5). In this state, if the user continues to perform the scroll operation, as shown in FIG. 6, left and right buttons of the first function input unit 38 disappear to a lower end of the screen 11, and the second function input unit 39 showing a top icon is displayed instead of a middle button showing the watch icon of the first function input unit 38. In this regard, the first function input unit 38 showing the clock icon disappears, and the second function input unit 39 showing the top icon is displayed. Alternatively, the first function input unit 38 showing the clock may be changed to the second function input unit 39 showing the top icon and displayed on the screen 11. In this example, the first function input unit 38 shown in FIGS. 4 and 5 is inside the screen 11, and thus, may be displayed in a circle, and the second function input unit 39 shown in FIG. 6 is over a boundary of the screen 11, and thus may be displayed in a semi-circle.

According to one or more example embodiments, when the second function input unit 39 is displayed instead of the first function input unit 38 on the screen 11, the display control unit 120 may control the first function input unit 38 to disappear from the screen 11, and control the second function input unit 39 to be displayed on the screen 11. According to at least this example embodiment, if the scroll operation is performed while the first function input unit 38 is displayed on the screen 11 as shown in FIG. 4, then the display control unit 120 may control the first function input unit 38 to disappear from the screen 11 and the second function input unit 39 to be displayed on the screen 11.

Alternatively, when the second function input unit 39 is displayed on the screen 11 instead of the first function input unit 38, the display control unit 120 may control the first function input unit 38 to be changed to the second function input unit 39. That is, for example, if the scroll operation is performed while the first function input unit 38 is displayed on the screen 11, as shown in FIG. 4, then the display control unit 120 may control two of three first function input units 38 (e.g., menu buttons) to disappear, and control the center menu button to move to the lower end and be changed to the second function input unit 39 (e.g., a top button).

In this regard, the display control unit 120 may control the second function input unit 39 to be displayed at an end of the screen 11 in a scroll direction. For example, when the user drags the screen 11 in the upward direction as shown in FIG. 6, the page is scrolled downward. In this state, the second function input unit 39 may be displayed at a lower end, which is the end corresponding to the scroll direction (a lower direction). On the contrary, when the user drags the screen 11 in the downward direction, the page is scrolled upward. In this state, the second function input unit 39 may be displayed at the upper end, which is an end of the scroll direction (an upper direction).

Thereafter, the display control unit 120 determines whether the second function input unit 39 is selected (operation S140).

In one example, if the display control unit 120 determines that the second function input unit 39 is selected, then the display control unit 120 moves to an uppermost end of the page such that the screen 11 displays the content at an uppermost end of the page (operation S150). More generally, when the user selects the second function input unit 39 the display control unit 120 moves to an end of the page that is opposite to the scroll direction.

Thereafter, the display control unit 120 determines whether the scroll operation has stopped (operation S160). If the display control unit 120 determines that the scroll operation has stopped, then the display control unit 120 displays the first function input unit 38 (operation S170) instead of the second function input unit 39. In this regard, the first function input unit 38 may be displayed instead of the second function input unit 39 immediately after the scroll operation has stopped. Alternatively, the first function input unit 38 may be displayed instead of the second function input unit 39 after expiration of a threshold interval of time after the scroll operation has stopped. These two cases may be applied when the scroll operation has stopped. As a result, the display control unit 120 returns to a state shown in FIG. 4 in which the first function input unit 38 is displayed (e.g., at the original position of the first function input unit).

According to at least some example embodiments, the display control unit 120 may control the second function input unit 39 to disappear from the screen 11 and the first function input unit 38 to be displayed. Alternatively, the display control unit 120 may control the first function input unit 38 to be changed to the second function input unit 39 and to be displayed.

Although not shown, the display control unit 120 may control the first function input unit 38 to be displayed on the screen 11 instead of the second function input unit 39 by moving the second function input unit 39 on the screen 11. That is, for example, in a state in which the second function input unit 39 is displayed on the screen 11 as shown in FIG. 5, if the user touches and drags the second function input unit 39 up, then the first function input unit 38 may be displayed on the screen 11 instead of the second function input unit 39.

According to at least some example embodiments, an effect of more quickly moving to a top end of a page, on which content is displayed in a time sequence during a scroll operation, may be obtained. Furthermore, an effect of providing a visual effect to a scroll function may be obtained.

As described above, according to the one or more example embodiments, display control apparatuses, display control methods, and non-transitory computer-readable mediums storing computer programs for executing display control methods on computers may enable quicker scrolling up to an end (e.g., top or bottom end) of a page on which one or more content regions are displayed (e.g., in a time sequence).

According to the one or more of example embodiments, display control apparatuses, display control methods, and tangible or non-transitory computer-readable storage mediums storing computer programs configured to cause computer devices to execute display control methods may provide one or more visual effects to scroll functions.

It should be understood that the example embodiments described therein should be considered in a descriptive sense only and not for purposes of limitation. Descriptions of features or aspects within each example embodiment should typically be considered as available for other similar features or aspects in other embodiments.

While one or more example embodiments have been described with reference to the figures, it will be understood by those of ordinary skill in the art that various changes in form and details may be made therein without departing from the spirit and scope of inventive concepts as defined by the following claims.

What is claimed is:

1. A method for controlling a terminal display, the method comprising:
    first displaying, on a screen of a terminal including at least one processor and a memory, a first function input unit and at least a portion of a page of content, the first function input unit being associated with a first function for the terminal;
    recognizing a scroll operation on the screen, the scroll operation including moving at least a portion of the first function input unit in a first direction with respect to at least one edge of the screen; and
    second displaying, in response to the recognizing the scroll operation on the screen, a second function input unit instead of the at least the portion of the first function input unit by replacing the at least the portion of the first function input unit with the second function input unit on the screen while the at least the portion of the first function input unit continuously moves in the first direction with respect to the at least one edge of the screen, the second function input unit being associated with a second function for the terminal.

2. The method of claim 1, wherein the replacing comprises:
    removing the at least the portion of the first function input unit from the screen; and
    inserting the second function input unit on the screen.

3. The method of claim 2, wherein
    the removing removes the at least the portion of the first function input unit while the screen is continuously moving in a first direction; and
    the inserting inserts the second function input unit at a location from which the at least the portion of the first function input unit has been removed.

4. The method of claim 2, further comprising:
    determining that the scroll operation has stopped;
    removing the second function input unit from the screen; and
    displaying the at least the portion of the first function input unit on the screen.

5. The method of claim 1, wherein the replacing comprises:
    changing an icon representing the at least the portion of the first function input unit to an icon representing the second function input unit.

6. The method of claim 1, further comprising:
    determining that the scroll operation has stopped; and
    changing the second function input unit into the at least the portion of the first function input unit in response to determining that the scroll operation has stopped.

7. The method of claim 1, further comprising:
    moving, in response to selection of the second function input unit, to one of a start and an end of the page of content such that the screen displays the one of the start and the end of the page of content at an end of the screen, the one of the start and the end of the page of content being in a direction opposite to a scroll direction of the scroll operation.

8. The method of claim 7, wherein
the one of the start and the end of the page of content is an upper end of the page of content; and
the scroll direction is towards a lower end of the page of content.

9. The method of claim 1, wherein the second displaying displays the second function input unit at an end of the screen in a scroll direction of the scroll operation.

10. The method of claim 1, further comprising:
third displaying, in response to movement of the second function input unit, the at least the portion of the first function input unit on the screen instead of the second function input unit.

11. The method of claim 1, further comprising:
third displaying, in response to movement of the second function input unit through a touch and drag by a user, the at least the portion of the first function input unit on the screen instead of the second function input unit.

12. The method of claim 1, wherein the first displaying comprises:
arranging and displaying the at least the portion of the page of content in a time sequence.

13. The method of claim 1, further comprising:
detecting that a speed of the scroll operation exceeds a threshold speed; and wherein
the second displaying displays the second function input unit instead of the at least the portion of the first function input unit in response recognizing the scroll operation and detecting that the speed of the scroll operation is greater than or equal to the threshold speed.

14. A non-transitory computer-readable storage medium storing computer executable instructions that, when executed by a computer device, cause the computer device to execute a method for controlling a terminal display comprising:
first displaying, on a screen of a terminal, a first function input unit and at least a portion of a page of content, the first function input unit being associated with a first function for the terminal;
recognizing a scroll operation on the screen, the scroll operation including moving a least a portion of the first function input unit in a first direction with respect to at least one edge of the screen; and
second displaying, in response to the recognizing the scroll operation on the screen, a second function input unit instead of the at least the portion of the first function input unit by replacing the at least the portion of the first function input unit with the second function input unit on the screen while the at least the portion of the first function input unit continuously moves in the first direction with respect to the at least one edge of the screen, the second function input unit being associated with a second function for the terminal.

15. An apparatus to control a terminal screen, the apparatus comprising:
a memory having computer-readable instructions stored therein; and
at least one processor configured to execute the computer-readable instructions to
display, on the terminal screen, a first function input unit and at least a portion of a page of content,
recognize a scroll operation on the portion of the page of content, the scroll operation including moving at least a portion of the first function input unit in a first direction with respect to at least one edge of the terminal screen; and
display, in response to recognizing the scroll operation on the portion of the page of content, a second function input unit instead of the at least the portion of the first function input unit by replacing the at least the portion of the first function input unit with the second function input unit on the terminal screen while the at least the portion of the first function input continuously moves in the first direction with respect to the at least one edge of the terminal screen.

16. The apparatus of claim 15, wherein the at least one processor is further configured to
replace the at least the portion of the first function input unit by removing, in response to the recognizing the scroll operation on the portion of the page of content, the at least the portion of the first function input unit from the terminal screen with the second function input unit on the terminal screen, and displaying the second function input unit on the terminal screen,
recognize that the scroll operation has stopped,
remove, in response to recognizing that the scroll operation has stopped, the second function input unit from the terminal screen, and
display the at least the portion of the first function input unit on the terminal screen.

17. The apparatus of claim 15, wherein the at least one processor is further configured to
replace the at least the portion of the first function input unit by changing the at least the portion of the first function input unit with the second function input unit in response to recognizing the scroll operation;
recognize that the scroll operation has stopped; and
change, in response to recognizing that the scroll operation has stopped, the second function input unit into the at least the portion of the first function input unit.

18. The apparatus of claim 15, wherein the at least one processor is further configured to move, in response to selection of the second function input unit, to one of a start and an end of the page of content such that the terminal screen displays the one of the start and the end of the page of content at an end of the terminal screen, the one of the start and the end of the page of content being in a direction opposite to a scroll direction of the scroll operation.

19. A method for controlling a terminal display, the method comprising:
first displaying, on a screen of a terminal including at least one processor and a memory, a first function input unit and at least a portion of a page of content, the first function input unit being associated with a first function for the terminal;
recognizing a scroll operation on the screen, the scroll operation including moving the first function input unit with the at least the portion of the page of content in a direction opposite to a scroll direction of the scroll operation;
second displaying, in response to the recognizing the scroll operation on the screen, a second function input unit instead of the at least the portion of the first function input unit by replacing the at least the portion of the first function input unit with the second function input unit on the screen, the second function input unit being associated with a second function for the terminal; and
changing the at least the portion of the first function input unit to the second function input unit in response to the first function input unit reaching an edge of the screen in the direction opposite to the scroll direction.

20. The method of claim 19, wherein the changing further includes:
   changing at least a first portion of the first function input unit to the second function input unit; and
   removing at least a second portion of the first function input unit from the screen.

* * * * *